United States Patent [19]

Murray et al.

[11] Patent Number: 4,568,553

[45] Date of Patent: Feb. 4, 1986

[54] FINELY GROUND ACIDULENTS IN HIGHLY-DUTCHED COCOA PUDDING MIXES

[75] Inventors: Gail P. Murray, Hamilton Township, Mercer County; Jeanne P. Angalet, Jackson, both of N.J.

[73] Assignee: General Foods Corporation, White Plains, N.Y.

[21] Appl. No.: 615,970

[22] Filed: May 31, 1984

[51] Int. Cl.⁴ ............................................. A23L 1/187
[52] U.S. Cl. .................................. 426/548; 426/579; 426/584; 426/631; 426/804
[58] Field of Search ............... 426/579, 578, 661, 631

[56] References Cited

U.S. PATENT DOCUMENTS

| | | | |
|---|---|---|---|
| 3,955,009 | 5/1976 | Eskritt et al. | 426/578 |
| 3,982,042 | 9/1976 | Arden | 426/631 |
| 4,262,031 | 4/1981 | Carpenter et al. | 426/579 |
| 4,361,592 | 11/1982 | Carpenter et al. | 426/579 |
| 4,438,148 | 3/1984 | O'Rourke | 426/579 |
| 4,469,712 | 9/1984 | Katcher et al. | 426/579 |

*Primary Examiner*—Jeanette Hunter
*Attorney, Agent, or Firm*—Basam E. Nabulsi; Thomas R. Savoie; Daniel J. Donovan

[57] ABSTRACT

A finely powdered unencapsulated food grade acid is incorporated into a pudding mix containing a starch and a highly-dutched cocoa. The finely powdered acid is added at such a level as to improve the texture and mouthfeel of a cooked pudding product by reducing the pH to less than 6.7 and preferably to between 6.3 to 6.6. The use of a finely-powdered, food-grade acid (less than 10% by weight retained on a #120 U.S. Screen and preferably less than 3% on a #120 U.S. Screen) has been found by the invention to eliminate dark spotting upon hydration and pudding formation, and to have good storage stability attributes.

20 Claims, No Drawings

FINELY GROUND ACIDULENTS IN HIGHLY-DUTCHED COCOA PUDDING MIXES

BACKGROUND OF THE INVENTION

The present invention relates to a method for the preparation of stabilized cocoa flavored and colored cooked pudding and pie filling mix and the products produced therefrom. More particularly, the invention teaches a dry or powdered cooked-pudding composition containing highly-dutched cocoa (i.e., having a pH of from 7.0 to 8.5) which does not exhibit the occurrence of dark spots upon hydration nor in the prepared pudding product, and which maintains a sharp pie cut and a firm pie texture.

It has been a desire in the art to overcome the relatively poor appearance, texture and mouthfeel which are typically characteristic of cooked puddings containing highly-dutched cocoa. Such cooked puddings were generally found to possess a softer texture and lower viscosity as compared to cooked puddings not containing highly-dutched cocoa, thus resulting in an undesirable inability to maintain a clean pie cut.

Carpenter et al. teach an improvement to the highly-dutched cocoa cooked-pudding art in U.S. Pat. No. 4,262,031, wherein an acidulant was added to the pudding mix resulting in an improvement to the texture and viscosity of the prepared cooked pudding product. However, the Carpenter et al. improvement introduced negative product attributes which would be at least as undesirable to consumers as those attributes sought to be improved upon. Encapsulated food grade acids, used according to Carpenter et at., produced a spotting phenomenon when the hydrated pudding mix containing highly-dutched cocoa was cooked and/or when the pudding product was gelled. Further, when according to Carpenter's preferred embodiment, acid whey is employed as the acidulant, excessive lumping of the acid whey during processing has been found to result.

It is a primary objective of the present invention to eliminate dark spotting upon the hydration and preparation of pudding mixes containing highly-dutched cocoa.

It is a further objective of this invention to formulate a pudding mix containing highly-dutched cocoa which, upon preparation, possesses a good texture, appearance and mouthfeel, and which is able to maintain a clean pie cut.

It is another object of the invention to eliminate the lumping of pudding mix ingredients during processing and thereby to maintain the ingredients in a free-flowing condition.

SUMMARY OF THE INVENTION

The objects of this invention are achieved by incorporating a finely-powdered, food-grade acid into a pudding mix containing ungelatinized starch and a highly-dutched cocoa. Said powdered acid is added at such a level as to improve the texture and mouthfeel of the cooked pudding product, typically at a level sufficient to reduce the pH to less than 6.7 and preferably to between 6.3 and 6.6. The use of a finely-powdered, food-grade acidulent in place of encapsulated food-grade acids has been found to eliminate dark spotting upon cooking and pudding formation, and to have good storage stability attributes. Fumaric acid is the preferred food-grade acid employed.

DETAILED DESCRIPTION OF THE INVENTION

The advantages of using a dutched cocoa in food formulations, and particularly pudding mixes, is well-known to those in the art. The dutching process involves treating cocoa with an alkaline substance such that the resulting pH is raised above 7.0. Said dutching treatment yields a cocoa that is darker in color and more intense in the characteristic cocoa flavor. As such, less dutched cocoa may be used in food product formulations to contribute an equivalent cocoa flavor and color as compared to natural cocoa. However, the use of highly-dutched cocoa in pudding formulations has been found to cause a loss in the cooked pudding's texture, viscosity and mouthfeel.

A typical cooked pudding formulation for preparing a cooked pudding product may contain a combination of well-known ingredients. The mix will generally contain an ungelatinized starch, a milk component, and optionally, such ingredients as sweeteners, stabilizers (e.g., gelatin and gums such as xanthan, agar, furcelleran, locust bean, carrageenan, etc., or combinations thereof), emulsifiers (e.g. Polysorbate 60, lecithin, mono and diglycerides, sodium stearoly-2-lactylate, etc.), flavors, colors, etc. The sweetener employed may be a sugar (e.g. sucrose, dextrose, invert sugar, fructose, corn syrups, etc.) or a lower calorie sweetener such as saccharin, APM or cyclamate. The ungelatinized starch can be a raw starch and/or a modified starch, and while corn starch is the preferred starch, other starches such as tapioca or waxy-maize are also suitable. The finished pudding contains a milk component (e.g., skim or whole milk) which may be satisfied by either hydrating the ingredients of the pudding mix with milk, or by adding milk solids to the pudding mix and hydrating with water.

A finely ground, food grade acidulent is also added to the pudding mix formulation according to the present invention such that the pH of the resultant cooked pudding is adjusted down to at least 6.7, and preferably between 6.3 and 6.6. This finely ground acidulant is not encapsulated according to this invention and is critically sized such that there is a maximum of 10% by weight of the acid retained on a #120 U.S. Screen, and preferably less than 3% on the #120 U.S. Screen. It is essential that the acid not be encapsulated because it has been found that any typically employed encapsulating medium, such as mono and digylcerides, when used to encapsulate a food grade acid, results in ring-like dark spotting in the gelled pudding product.

The food-grade acid particle size distribution has been found to be equally essential to preventing dark spotting in highly-dutched cocoa cooked pudding products according to the invention. Granulated food grade acids having particle size distributions outside the prescribed range for the invention (i.e., greater than 10% retained on a #120 U.S. Screen by weight) have been found to yield highly undesirable dark spots in highly-dutched cocoa-containing cooked pudding products. It is theorized that both encapsulation of food grade acids and coarser sized food grade acids (greater than 10% on a #120 U.S. Screen) result in spot coagulation of milk protein during the gelling process. The present invention overcomes the coagulation phenomenon by finely grinding the acid particles to a critical size distribution such that the acid particles are thoroughly dispersed in the pudding formulation when mixed with milk, and are very quickly released (solubilized) into the hydrated blend. However, this is only a theory and the present invention is not limited thereto.

The present invention has been found to be applicable to a full range of food grade acids, such as citric, fumaric, adipic, tartaric, malic, ascorbic, lactic, etc. or a combination thereof. The preferred acid for the invention is fumaric. The amount of acid added to the pudding mix formulation is, as described previously, determined by the amount necessary to reduce the pH to below 6.7, and preferably to between 6.3 to 6.6. Thus, the amount added is dependent upon the amount of highly-dutched cocoa present in the formulation, and is generally from about 0.05% to about 0.17% by weight of the total hydrated pudding mix, and typically from about 0.07% to 0.15%.

Highly-dutched cocoa-containing pudding mixes prepared according to the present invention (i.e., with finely-ground, food-grade acids added) were tested for storage stability. It was found that pudding mixes with unencapsulated, finely-ground (less than 10% on a #120 U.S. Screen by weight) food-grade acid added exhibited good storage stability. There was evidenced no degradative interaction between the food-grade acid and the other pudding mix ingredients (e.g., ungelatinized starch) during the stability test either at room temperature or at an accelerated storage temperature (110° F.).

The process of the present invention involves mixing and hydrating the ungelatinized starch, sweetener, dutched cocoa, and acidulent, followed by cooking the hydrated pudding mixture and then cooling the cooked pudding. The hydration can either be carried out with milk or with water if the composition contains milk solids. Cooking is carried out to gelatinize the starch in the pudding mixture and typically it is carried out at a temperature greater than 150° F. (65° C.) for a starch such as cornstarch. While the pudding composition of the present invention would typically be sold as a dry mix to be hydrated, cooked and cooled by the consumer, it may also be hydrated, cooked, cooled, packaged (e.g. canned) and optionally frozen by a manufacturer, and then sold to the consumer in the prepared form. The cooked pudding composition and dry pudding mix of this invention can be used as a pie filling or the like, as well as a pudding.

EXAMPLE

A dry pudding mix was prepared by mixing together the following ingredients:

| INGREDIENTS | GRAMS |
| --- | --- |
| Sugar | 60 |
| Raw Cornstarch | 17 |
| Highly-Dutched Cocoa Powder (pH-7.23) | 12 |
| Modified Cornstarch | 8 |
| Finely Ground Fumaric Acid (3% by weight retained on a #120 U.S. Screen) | 0.15 |
| Salt | 1 |
| Vanilla Flavor | 0.25 |
| Calcium Carrageenan | 0.2 |
| Polysorbate 60 | 0.2 |

The dry pudding mix was hydrated by mixing it with 2 cups (474 ml) of cold milk. The hydrated pudding mix was then cooked over medium heat until the pudding came to a boil, followed by chilling the pudding for about 1 to 2 hours to set the pudding. The pH of the resultant cooked pudding was about 6.4.

To prepare a pie filling the dry pudding mix is hydrated with 2¼ cups (533 ml) of cold milk, followed by cooking the hydrated mix to a full bubbling boil, then chilling for 3 hours. The pH of the resultant cooked pie filling was about 6.4.

Both the cooked pudding composition and the cooked pie filling exhibited a sharp pie cut (retained shape after cutting with a spoon), a firm texture and a desirable color, flavor, mouth-feel, appearance and viscosity. No dark spotting was observed during hydration and cooking of the pudding nor after the pudding had gelled. These physical properties obtained were judged to be equivalent, if not slightly superior (especially in color and flavor), to those obtained with cooked pudding products or pie fillings containing natural or lightly-dutched cocoas.

What is claimed is:

1. A process for preparing an improved cooked pudding composition which contains highly-dutched cocoa comprising:
   (a) mixing and hydrating an ungelatinized starch, a sweetener, a milk component, a dutched cocoa having a pH of 7.0 or higher, and an unencapsulated, food-grade acid in an amount sufficient to reduce the pH of the cooked pudding to 6.7 or less, said food-grade acid being sized such that less than 10% by weight is retained on a #120 U.S. Screen;
   (b) cooking the hydrated pudding mix; and
   (c) cooling the cooked pudding to gel the pudding.

2. Process of claim 1 wherein the amount of food-grade acid is effective to adjust the pH of the cooked pudding to about 6.3 to 6.6.

3. Process of claim 1 wherein the starch is chosen from the group consisting of cornstarch, tapioca starch and waxy-maize starch.

4. Process of claim 1 wherein the cooked pudding further comprises a stabilizer.

5. Process of claim 4 wherein the stabilizer is a gum.

6. Process of claim 1 wherein the cooked pudding further comprises an emulsifier.

7. Process of claim 1 wherein the food-grade acid is chosen from the group consisting of citric, fumaric, adipic, tartaric, malic, ascorbic and lactic.

8. Process of claim 1 wherein the food-grade acid is fumaric acid.

9. Process of claim 1 wherein said food-grade acid is sized such that less than 3% by weight is retained on a #120 U.S. Screen.

10. Process of claim 1 wherein the milk component is milk solids and the mixture is hydrated with water.

11. Process of claim 1 wherein the mixture is hydrated with a liquid milk, and the milk component is said liquid milk.

12. Process of claim 1 further comprising packaging said cooked pudding.

13. Process of claim 1 further comprising freezing said cooked pudding.

14. Process of claim 1 wherein the sweetener is a sugar.

15. Process of claim 1 wherein the sweetener is a low-calorie sweetener.

16. Product produced by the process of claim 1.

17. Dry pudding mix containing highly dutched cocoa for preparing a milk-containing cooked pudding composition comprising:

an ungelatinized starch; a sweetener; a dutched cocoa having a pH above 7.0; and an unencapsulated, food-grade acid in an amount effective to impart a desired texture and viscosity to the cooked pudding and adjust the pH of the cooked pudding to about 6.7, said food-grade acid being sized such that less than 10% by weight is retained on a #120 U.S. Screen.

18. The mix of claim 17 wherein the starch is chosen from the group consisting of cornstarch, tapioca starch, and waxy-maize starch.

19. The mix of claim 17 wherein the food-grade acid is chosen from the group consisting of citric, fumaric, adipic, tartaric, malic, ascorbic, and lactic.

20. The mix of claim 17 wherein the good-grade acid is sized such that less than 3% by weight is retained on a #120 U.S. Screen.

* * * * *